United States Patent
Gotou et al.

(10) Patent No.: US 7,114,412 B2
(45) Date of Patent: Oct. 3, 2006

(54) BREATHER STRUCTURE FOR TRANSFER

(75) Inventors: Atsuhiko Gotou, Kanagawa (JP); Hirotaka Kusukawa, Tokyo (JP)

(73) Assignee: Nissan Motor Co., Ltd., Kanagawa (JP)

( * ) Notice: Subject to any disclaimer, the term of this patent is extended or adjusted under 35 U.S.C. 154(b) by 148 days.

(21) Appl. No.: 10/347,440

(22) Filed: Jan. 21, 2003

(65) Prior Publication Data
US 2003/0136219 A1 Jul. 24, 2003

(30) Foreign Application Priority Data
Jan. 21, 2002 (JP) ............................. 2002-011244

(51) Int. Cl.
*F16H 57/04* (2006.01)
(52) U.S. Cl. ............................................. 74/606 R
(58) Field of Classification Search .............. 74/606 R; 180/233; 414/217, 217.1, 221, 222.12; 184/6.23, 184/6.27, 11.1, 13.1, 59; 55/434, 462–465
See application file for complete search history.

(56) References Cited

U.S. PATENT DOCUMENTS

| | | | |
|---|---|---|---|
| 4,498,353 A | 2/1985 | Kitade | |
| 4,911,035 A * | 3/1990 | Taguchi | 74/606 R |
| 6,557,438 B1 * | 5/2003 | Maeda et al. | 74/606 R |
| 6,719,096 B1 * | 4/2004 | Mogi | 184/6.23 |
| 2002/0104701 A1 * | 8/2002 | Fukuda | 180/224 |

FOREIGN PATENT DOCUMENTS

| | | |
|---|---|---|
| DE | 199 45 897 A1 | 4/2000 |
| JP | 58-99549 | 7/1983 |
| JP | 58-166166 | 10/1983 |
| JP | 61-021468 A | 1/1986 |
| JP | 10-325456 | 12/1990 |
| JP | 03-069847 A | 3/1991 |
| JP | 03288054 A * | 12/1991 |
| JP | 7-215079 | 8/1995 |
| JP | 2001-90816 A | 4/2001 |

* cited by examiner

Primary Examiner—Vicky A. Johnson
(74) Attorney, Agent, or Firm—McDermott Will & Emery LLP

(57) ABSTRACT

A first casing structure defines an atmospheric chamber between a transfer and a transmission. A second casing structure defines a transfer chamber containing a transfer mechanism of the transfer, and further defines a connecting passage through which the transfer chamber is connected to the atmospheric chamber. A gas-liquid separating device is interposed between the transfer chamber and the connecting passage so that the transfer chamber and the connecting passage are connected through the gas-liquid separating device.

20 Claims, 5 Drawing Sheets

BREATHER STRUCTURE FOR TRANSFER

BACKGROUND OF THE INVENTION

The present invention relates to a breather setup or structure for a transfer of a vehicle, or to a power transmission mechanism including such a breather structure.

A 4WD vehicle usually includes a power transmission mechanism of a transmission and a transfer. A transfer chamber containing the transfer mechanism is provided with a breather device for preventing a lubricating oil from leaking out of the chamber through sealed portions, by releasing the internal pressure when the internal pressure in the transfer chamber is increased by an increase in the temperature in transfer chamber.

Published Japanese Utility Model Application Kokai No. S58(1983)-99549 shows a breather device for a transfer, utilizing a breather hose. To prevent intrusion of water and dirt in such a breather device, one example employs a breather hose whose end is positioned high in an engine compartment, or inserted into a side member. Another example employs a breather plug.

SUMMARY OF THE INVENTION

It is an object of the present invention to provide a power transmission mechanism with a breather setup to prevent invasion of water and dirt effectively.

According to the present invention, a power transmission mechanism comprises: a first casing structure defining an atmospheric chamber which is formed between a transfer and a transmission connected with the transfer, and which is opened to an outside; a second casing structure defining a transfer chamber receiving a transfer mechanism of the transfer, and defining a connecting passage through which the transfer chamber is connected to the atmospheric chamber; and a gas-liquid separating device interposed between the transfer chamber and the connecting passage so that the transfer chamber and the connecting passage are connected through the gas-liquid separating device.

According to another aspect of the present invention, a power transmission mechanism comprises: a first casing structure including a transmission case defining an atmospheric chamber; and a second casing structure defining a transfer chamber receiving a transfer mechanism of the transfer, and defining a connecting passage. The second casing structure includes a transfer case joined to the transmission case in a joint surface. The atmospheric chamber is opened to an outside through a clearance in the joint surface between the transmission case and the transfer case.

According to still another aspect of the present invention, a power transmission mechanism comprises: a first casing structure including a transmission case defining an atmospheric chamber; and a second casing structure defining a transfer chamber, and defining a connecting passage. The second casing structure includes a transfer case joined to the transmission case in a joint surface. At least one of the transmission case and the transfer case includes a rib wall formed with at least one reinforcing rib and arranged to define the atmospheric chamber.

According to still another aspect of the invention, a transfer breather structure for a transfer, comprises: (i) means for defining an atmospheric chamber; (ii) means for defining a transfer chamber; (iii) means for defining a connecting passage connecting the transfer chamber to the atmospheric chamber; (iv) means for opening the atmospheric chamber to the outside; and (v) means for separating gas from a lubricating oil in the transfer chamber, and leading the gas to the connection passage.

The other objects and features of this invention will become understood from the following description with reference to the accompanying drawings.

DETAILED DESCRIPTION OF THE INVENTION

FIGS. 1~6 show a power transmission mechanism according to one embodiment of the present invention. In this embodiment, the power transmission mechanism is a mechanism for a 4WD vehicle. This power transmission mechanism includes a basic structure common to FF vehicles and 4WD vehicles.

Figure 1:
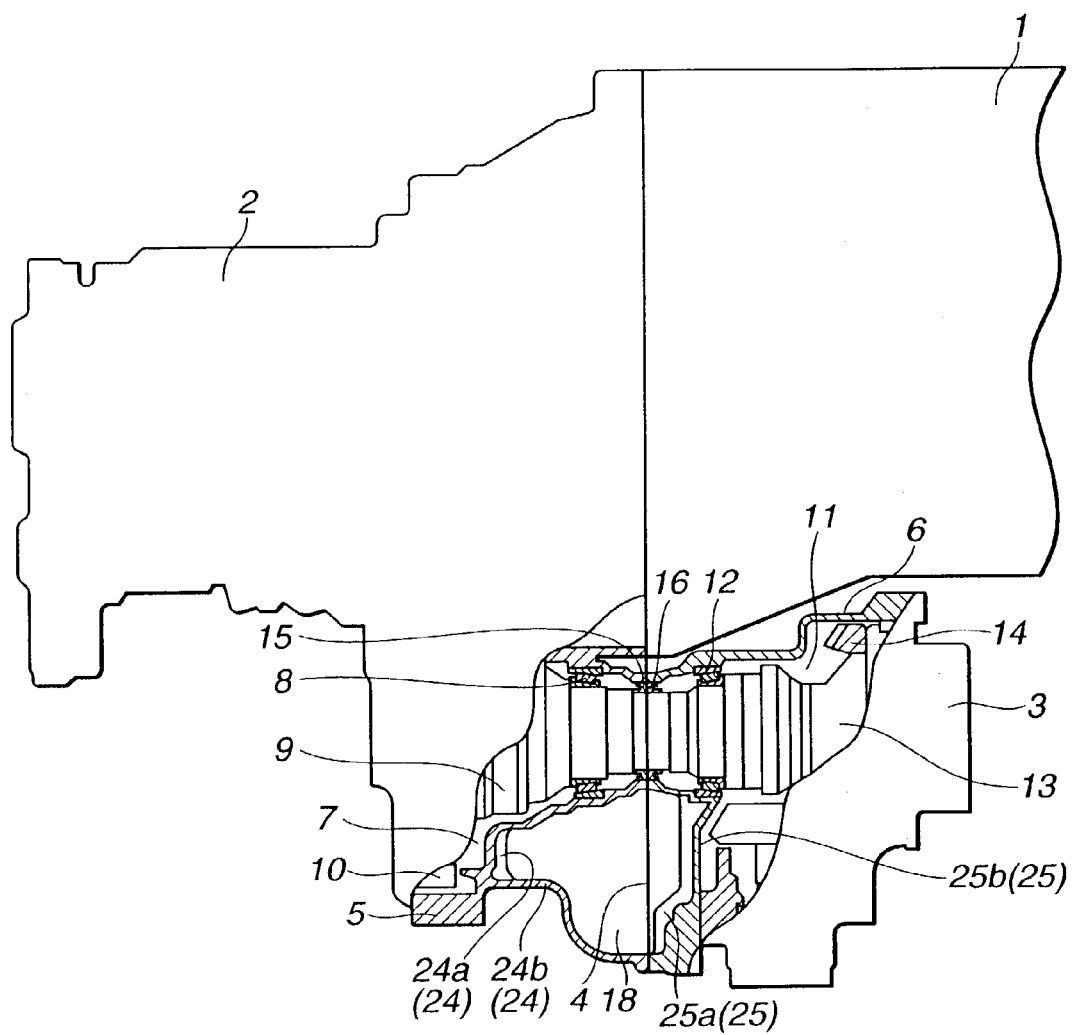
FIG. 1 is a top view showing, partly in section, a power transmission mechanism according to one embodiment of the present invention.

As shown in FIG. 1, an engine 1 and a transmission 2 are connected together. A transfer 3 is connected with transmission 2 in a joint surface 4. Transmission 2 can transmit a driving force produced by engine 1 at a reduced speed, to transfer 3. Transfer 3 can distribute the driving force inputted from transmission 2 between front axle and rear axle. Transmission 2 includes a transmission case 5, and transfer 3 includes a transfer case 6.

Transmission case 5 defines therein a transmission chamber (or inside chamber) 7 in which there are provided a torque converter, a planetary gear system, a differential gear 9 supported by a bearing 8, and a final drive gear 10 attached to differential gear 9. Transfer case 6 defines therein a transfer chamber (or driving force transmitting chamber) 11 in which there are provided a transfer input shaft 13 supported by bearing 12, a transfer input gear 14 mounted on transfer input shaft 13, and other driving force transmitting components constituting a transfer mechanism. Transfer chamber 11 is arranged to store a lubricating oil for lubricating the transfer mechanism.

First and second seal members 15 and 16 are disposed near joint surface 4, and arranged to seal transmission 2 and transfer 3, respectively. Therefore, transfer chamber 11 and transmission chamber 7 are separated from each other. Moreover, transfer chamber 11 is sealed from the outside with a seal structure. Thus, the lubricating oil is held within transfer chamber 11 without leaking into transmission chamber 7 of transmission case 5, or to the outside as long as the internal pressure of transfer chamber 11 is held within a predetermined range.

A transfer breather device or structure is provided for holding the internal pressure in transfer chamber 11 at a predetermined level even if the internal temperature in transfer chamber 11 changes. The breather device includes a partition member 20 defining a gas-liquid separating chamber 17 for separating the lubricating oil and the gas in transfer chamber 11 and thereby to prevent the lubricating oil from leaking into the outside, and a passage defining member 19 defining a connecting passage for connecting the gas-liquid separating chamber to an atmospheric chamber 18 formed between transmission 2 and transfer 3. In this embodiment, the passage defining member is a tubular member which, in this example, is a hose 19.

In this embodiment, transmission case 5 serves as a constituent member of a first casing structure defining atmospheric chamber 18. Transfer case 6 serves as a constituent member of a second casing structure defining transfer chamber 11 and defining the connecting passage through which transfer chamber 11 is connected to atmospheric chamber 18. Hose 19 is a second member of the second casing structure for defining the connecting passage.

Figure 3:
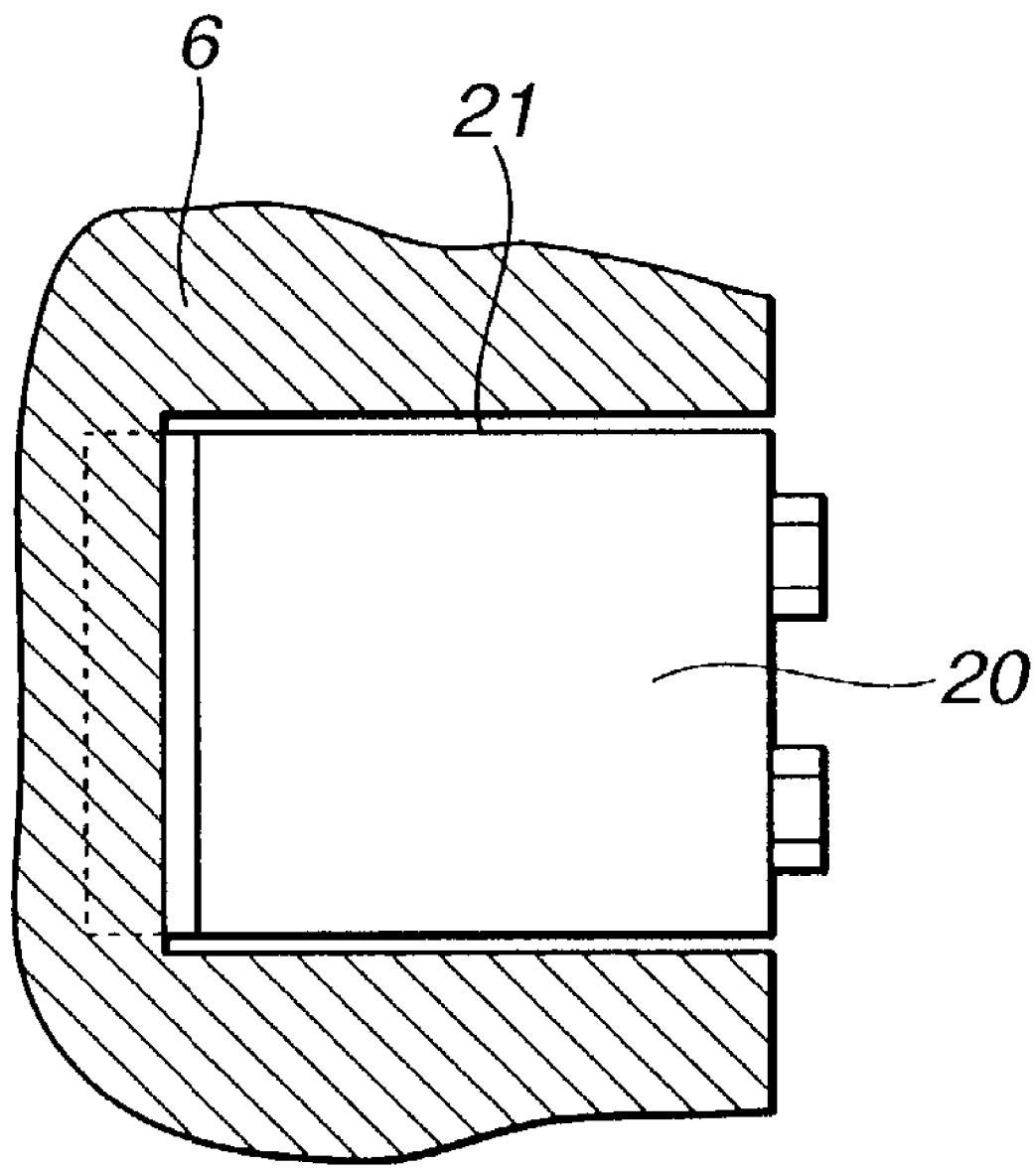
FIG. 3 is a view as viewed from an arrow C in FIG. 2.

Partition member 20 is fixed to the inside surface of transfer case 6, and arranged to separate gas-liquid separating chamber 17 from transfer chamber 11. Gas-liquid separating chamber 17 is connected with transfer chamber 11 through a limited clearance 21 as shown in FIG. 3. Gas-liquid separating chamber 17 is bounded between partition member 20 and a portion of transfer case 6 in which there is formed a hole 22. A connector 23 is fixedly fit in hole 22, and inserted into a first end of hose 19. In this way, transfer chamber 11 is connected with hose 19 through gas-liquid separating chamber 17. Gas-liquid separating chamber 17 defined by partition member 20 serves as means for separating gas and liquid.

Atmospheric chamber 18 is bounded between a first wall 24 of transmission case 5, and a second wall 25 of transfer case 6. First wall 24 defines a depressed portion depressed from joint surface 4 in which transmission case 5 and transfer case 6 are joined together, toward the first side (the left side as viewed in FIG. 2). Second wall 25 defines a depressed portion depressed from joint surface 4, toward the second side, that is the right side as viewed in FIG. 2. These depressed portions are joined together to form atmospheric chamber 18 between first and second walls 24 and 25. First wall 24 separates atmospheric chamber 18 and transmission chamber 7 from each other.

Figure 4:
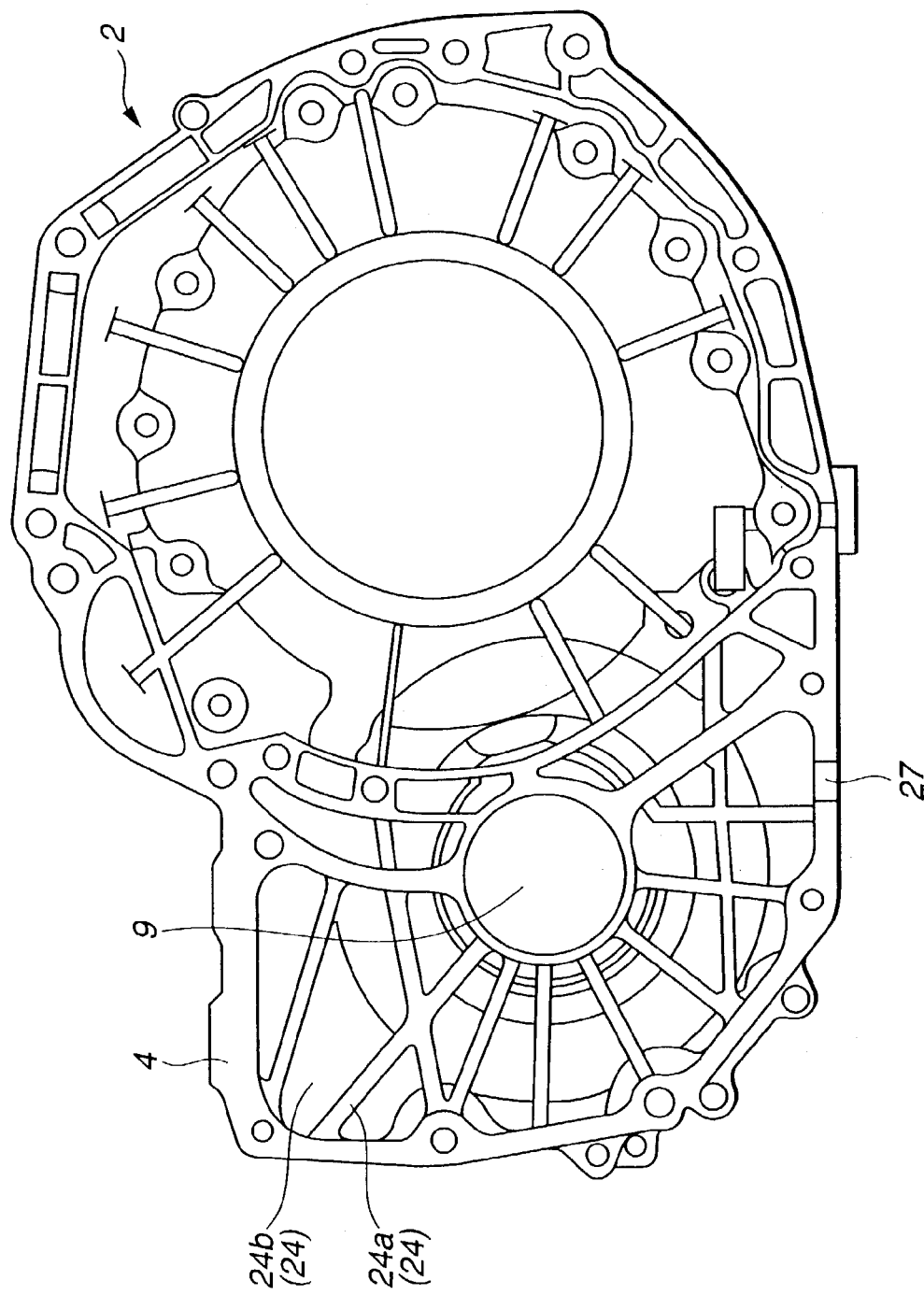
FIG. 4 is a view of a transmission of the power transmission mechanism of FIG. 1, as viewed from the transfer's side.
Figure 5:
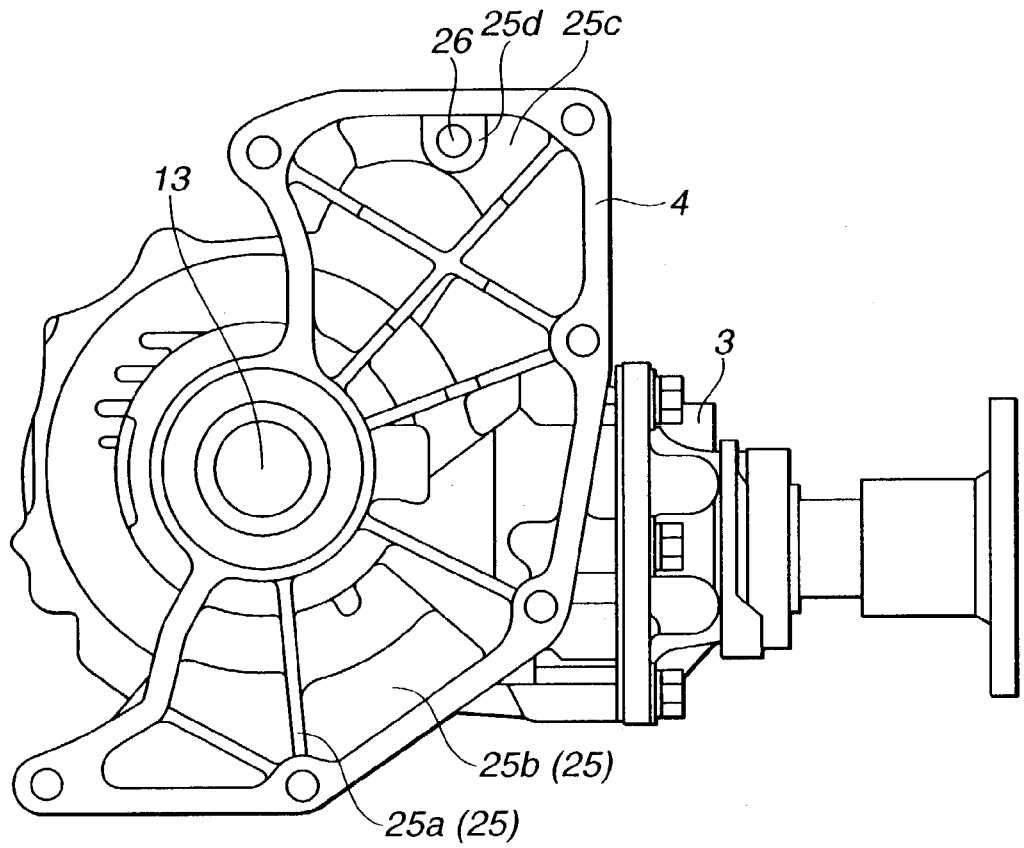
FIG. 5 is a view of a transfer of the power transmission mechanism of FIG. 1, as viewed from the transmission's side.

In this example, first wall 24 of transmission case 5 includes a plurality of ribs 24a reinforcing transmission case 5 and wall portions 24b spreading among ribs 24a, as shown in FIG. 4. Similarly, second wall 25 of transfer case 6 includes a plurality of ribs 25a reinforcing transfer case 6, and wall portions 25b spreading among ribs 25a, as shown in FIG. 5.

A connection hole 26 is formed in second wall 25 of transmission case 6, and designed to receive a second end of hose 19. Connection hole 26 extends horizontally, along the axis of transfer input shaft 13 or along a center hole receiving transfer input shaft 13. The second end of hose 19 is inserted into an upper portion of atmospheric chamber 18 through the horizontally extending connection hole 26. Connection hole 26 is located above the center hole of transfer case 6 receiving transfer input shaft 13, whereas an atmospheric hole 27 is located below the level of the center hole.

Figure 2:
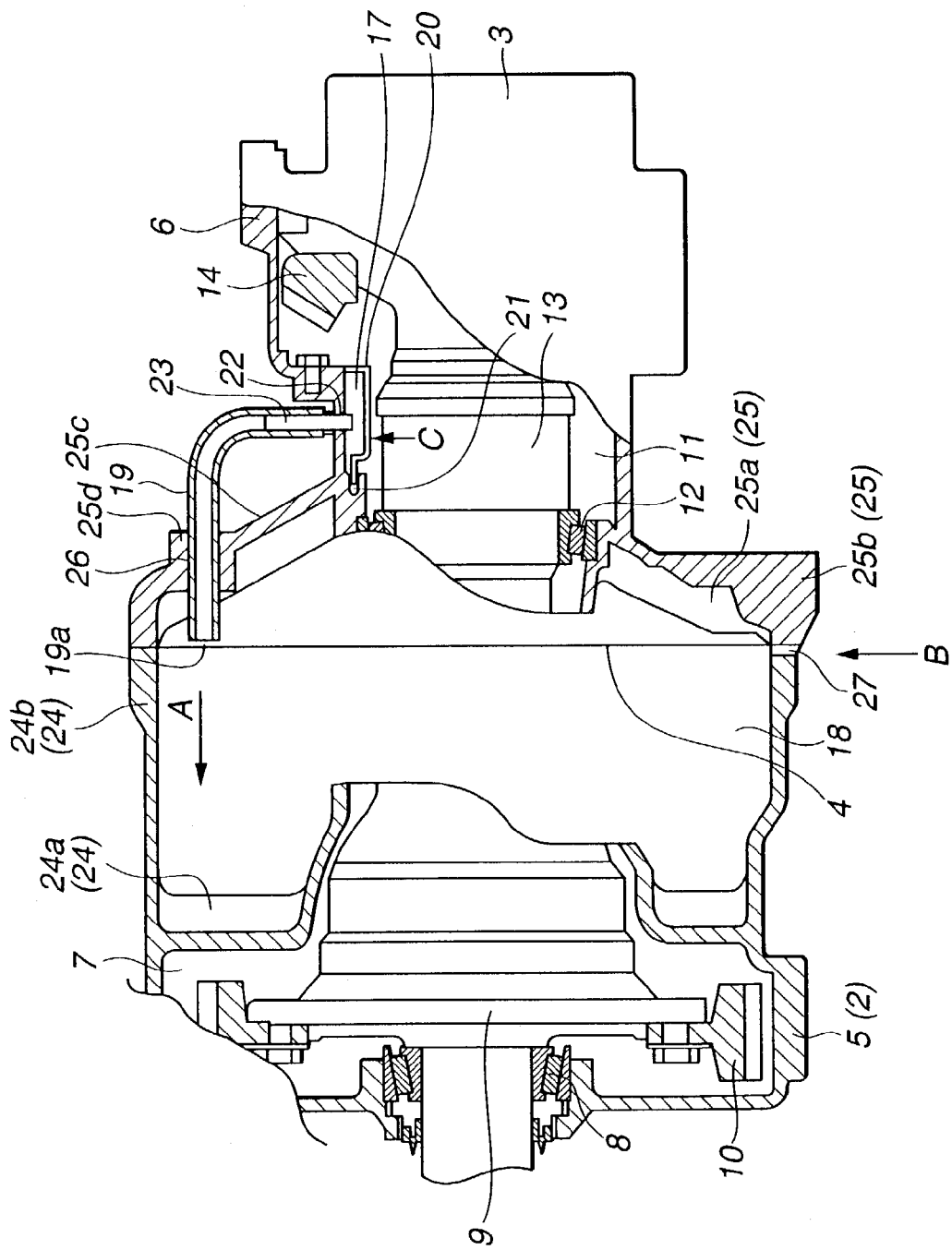
FIG. 2 is a sectional view showing the power transmission mechanism of FIG. 1.

Second wall 25 is a slant or conical wall, and has a wall portion 25d in which horizontally extending connection hole 26 is formed. Wall portion 25d has vertically extending outside and inside end surfaces. The outer end of horizontally extending connection hole 26 is opened in the vertically extending outside end surface, and the inner end of horizontally extending connection hole 26 is opened in the vertically extending inside end surface. The vertically extending outside end surface of wall portion 25d extends upward from the upper end of a lower slant outside wall surface of second wall 25. Thus, the hose inserting direction A shown in FIG. 2 is perpendicular to the vertically extending outside and inside end wall surfaces of wall portion 25d.

Figure 6:
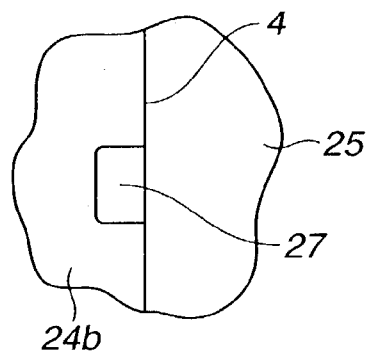
FIG. 6 is a view as viewed from an arrow B in FIG. 2.

In the illustrated embodiment, atmospheric hole 27 is formed in a lower portion of atmospheric chamber 18. Atmospheric chamber 18 is opened to the outside through atmospheric hole 27. In this example, atmospheric hole 27 extends downwards from atmospheric chamber 18 at the deepest portion adjacent to joint surface 4. As shown in FIG. 6, atmospheric hole 27 is defined between second wall 25 of transfer case 6 and transmission case 5.

The breather device according to this embodiment functions to hold the pressure in transfer chamber 11 at a predetermined pressure level in the following manner.

When the internal pressure increases in transfer chamber 11 with increase in the temperature in transfer chamber 11, the gas in transfer chamber 11 is pushed into gas-liquid separating chamber 17 through clearance 21 between partition member 20 and transfer case 6. The gas is further conveyed from gas-liquid separating chamber 17 through connection passage 19 to atmospheric chamber 18 opening to the outside through atmospheric hole 27. In this way, the gas-liquid separating device can hold the internal pressure in transfer chamber 11 at the predetermined pressure level by transmitting the internal pressure to the outside through gas-liquid separating device.

When the internal pressure in transfer chamber 11 decreases, air is sucked from the outside through atmospheric hole 27, atmospheric chamber 18, connecting hose 19 and gas-liquid separating chamber 17, into transfer chamber 11. Thus, the gas-liquid separating device can hold the internal pressure in transfer chamber 11 at the predetermined level.

The breather device according to this embodiment functions to prevent the lubricating oil from leaking to the outside in the following manner.

Partition member 20 prevents the lubricating oil splashed by transfer input gear 14, for example, from entering the gas-liquid separating chamber 17. Even if the lubricating oil is brought into gas-liquid separating chamber 17 through clearance 21, the lubricating oil has already lost its power, so that the lubricating oil falls downwards through clearance 21 into transfer chamber 11. In this way, the gas-liquid separating device can separate the lubricating oil from the gas properly, and prevent the lubricating oil from entering hose 19. The gas-liquid separating device can prevent the lubricating oil from leaking to the outside in this way.

The breather device according to this embodiment functions to prevent water and dirt from entering transfer chamber 11 in the following manner.

In general, transfer 3 is located at the underside of the vehicle, and exposed to muddy water. However, the open end 19a of hose 19 is not exposed to the outside, but covered by first and second walls 24 and 25 and concealed in atmospheric chamber 18. Therefore, water cannot reach directly to hose end 19a. If, by some rare accident, transfer 3 is submerged, atmospheric chamber 18 is opened to the outside only at atmospheric hole 27 located at the bottom of atmospheric chamber 18, and therefore atmospheric chamber 18 is not filled with water immediately. Even if water enters atmospheric chamber 18, the water level will not soon reach the height of hose end 19a located near the upper end of atmospheric chamber 18. Atmospheric hole 27 formed in the bottom of atmospheric chamber 18 drains water out of atmospheric chamber 18.

Connection hole 26 is formed horizontally in second wall 25, and hose end 19a, opens horizontally instead of opening upwards. Therefore, even if water falls from above in atmospheric chamber 18, water does not enter hose 19 directly. Hose end 19a of hose 19 of this example does not slope downward. Therefore, even if hose 19 is inserted into atmospheric chamber 18 deeply, the height of hose end 19a does not lower.

Atmospheric chamber 18 of this embodiment is formed by first and second walls 24 and 25 designed to serve as a structure for reinforcing the casing. Atmospheric chamber 18 is thus formed compactly and effectively for size reduction and reinforcement. Moreover, at least one of first and second walls 24 and 25 is a rib wall formed with at least one reinforcing rib 24a or 25b and wall sections 24b and 25b having a relatively small wall thickness.

Second wall 25 of this example is conical, and has a slant wall in view of the rigidity and weight of transfer case 6. If the horizontally extending connection hole 26 is formed directly in the conical second wall 25, there would be formed an acute edge which would injure the hose during operations of inserting and removing hose 19. Wall portion 25d having vertical end surfaces having therein the open ends of horizontally extending connection hole 26 is effective in eliminating an acute edge, and preventing injury of hose 19.

The breather device according to this embodiment employs only the short hose 19 and does not require a breather pipe and a breather plug. Moreover, both ends of hose 19 are connected with transfer case 6. This arrangement is advantageous in simplifying the structure, eliminating the need for designing pipes and preparing new parts for the combination of the vehicle and the torque transmitting apparatus of transmission 2 and transfer 3, and the combination of transfer 3 and transmission 2, and in facilitating the assembly operations of connecting the power transmission mechanism to the vehicle body, and connecting transfer 3 to transmission 2.

Joint surface 14 of this embodiment is a metal-to-metal contact surface between transmission case 5 and transfer case 6. Therefore, there are formed, in joint surface 4, one or more minute clearances through which atmospheric chamber 18 is opened to the outside. With these clearances, atmospheric chamber 18 is held open to the outside even if atmospheric hole 27 is closed by mud. Furthermore, it is optional to omit atmospheric hole 27, and instead to use the clearances in joint surface 14 as a passage for draining water from atmospheric chamber 18.

It is possible to form the connection passage integrally in transfer case 6, without using hose 19. In this case, for example, second wall 25 is formed with a connection passage extending from gas-liquid separating chamber 17 to atmospheric chamber 18. In this case, the second casing structure defining transfer chamber 11, and defining the connecting passage connecting transfer chamber 11 to atmospheric chamber 18 includes transfer case 6, and does not include hose 19.

In the illustrated embodiment, means for defining an atmospheric chamber corresponds to transmission case 5. Means for defining an atmospheric chamber corresponds to at least one of transmission case 5, and first and second walls 24 and 25. Means for defining a transfer chamber corresponds to a main portion of transfer case 6 enclosing transfer chamber 11. Means for defining a connecting passage corresponds to tubular member 19, or to a part of transfer case 6 defining the connecting passage. Means for opening the atmospheric chamber to an outside corresponds to at least one of atmospheric hole 27 and joint surface 4. Means for separating gas from a lubricating oil in the transfer chamber, and leading the gas to the connection passage corresponds to partition member 20.

This application is based on a prior Japanese Patent Application No. 2002-011244 filed in Japan on Jan. 21, 2002. The entire contents of this prior Japanese Patent Application No. 2002-011244 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A power transmission mechanism comprising:
a first casing structure defining an atmospheric chamber which is formed between a transfer and a transmission connected with the transfer, and which is opened to an outside;
a second casing structure defining a transfer chamber receiving a transfer mechanism of the transfer, and defining a connecting passage through which the transfer chamber is connected to the atmospheric chamber; and
a gas-liquid separating device interposed between the transfer chamber and the connecting passage so that the transfer chamber and the connecting passage are connected through the gas-liquid separating device,
wherein the first casing structure includes a separating wall extending between the transfer and the transmission and separating the atmospheric chamber from a transmission chamber containing a transmission mechanism; and
wherein the second casing structure includes a separating wall extending between the transfer and the transmission and defining the atmospheric chamber between the separating wall of the first casing structure and the separating wall of the second casing structure; and
wherein each of the separating walls is formed with reinforcing ribs formed in the atmospheric chamber.

2. The power transmission mechanism as claimed in claim 1, wherein the first casing structure comprises a transmission case which includes the separating wall of the first casing structure, and the second casing structure comprises a transfer case which is joined with the transmission case in a joint surface, and which includes the separating wall of the second casing structure; the atmospheric chamber is formed between the transmission case and the transfer case; and the gas-liquid separating device is arranged to prevent passage of a lubricating oil from the transfer chamber to the connecting passage.

3. The power transmission mechanism as claimed in claim 2, wherein the second casing structure further comprises a tubular member defining the connecting passage and including a first end opening into the gas-liquid separating device, and a second end connected into the atmospheric chamber.

4. The power transmission mechanism as claimed in claim 3, wherein the second casing structure comprises a wall portion defining a horizontally extending hole into which the second end of the tubular member is inserted.

5. The power transmission mechanism as claimed in claim 4, wherein the wall portion includes a vertically extending outside end wall surface extending upwards from a slant outside wall surface of the transfer case, and the horizontally extending hole is opened in the vertically extending end wall surface.

6. The power transmission mechanism as claimed in claim 3, wherein the tubular member is a flexible hose.

7. The power transmission mechanism as claimed in claim 2, wherein the atmospheric chamber is bounded between the separating wall of the first casing structure on one side of the joint surface, and the separating wall of the second casing structure on the other side of the joint surface.

8. The power transmission mechanism as claimed in claim 7, wherein
   the gas-liquid separating device includes a partition member defining a gas-liquid separating chamber,
   the second casing structure includes a tubular member defining the connecting passage and extending from a first end to a second end,
   the tubular member is flexible, the first end of the tubular member is connected to the gas-liquid separating chamber, and
   the second end of the tubular member is connected with the second wall.

9. The power transmission mechanism as claimed in claim 7, wherein the second wall of the transfer case is formed with a plurality of reinforcing ribs and the first wall of the transmission case is formed with a plurality of reinforcing ribs.

10. The power transmission mechanism as claimed in claim 2, wherein the connecting passage is formed integrally in the transfer case.

11. The power transmission mechanism as claimed in claim 1, wherein the power transmission mechanism further comprises seal members to seal off the transfer chamber from the transmission chamber and from the outside.

12. A power transmission mechanism comprising:
   a first casing structure defining an atmospheric chamber which is formed between a transfer and a transmission connected with the transfer, and which is opened to an outside;
   a second casing structure defining a transfer chamber receiving a transfer mechanism of the transfer, and defining a connecting passage through which the transfer chamber is connected to the atmospheric chamber; and
   a gas-liquid separating device interposed between the transfer chamber and the connecting passage so that the transfer chamber and the connecting passage are connected through the gas-liquid separating device, wherein
   the first casing structure comprises a transmission case and the second casing structure comprises a transfer case joined with the transmission case in a joint surface,
   the atmospheric chamber is formed between the transmission case and the transfer case,
   the gas-liquid separating device is arranged to prevent passage of a lubricating oil from the transfer chamber to the connecting passage, and
   the second casing structure includes a lower portion defining an atmospheric hole formed in a lower portion of the atmospheric chamber and opened to the atmosphere.

13. A power transmission mechanism comprising:
   a first casing structure defining an atmospheric chamber which is formed between a transfer and a transmission connected with the transfer, and which is opened to an outside;
   a second casing structure defining a transfer chamber receiving a transfer mechanism of the transfer, and defining a connecting passage through which the transfer chamber is connected to the atmospheric chamber; and
   a gas-liquid separating device interposed between the transfer chamber and the connecting passage so that the transfer chamber and the connecting passage are connected through the gas-liquid separating device, wherein
   the first casing structure comprises a transmission case and the second casing structure comprises a transfer case joined with the transmission case in a joint surface,
   the atmospheric chamber is formed between the transmission case and the transfer case,
   the gas-liquid separating device is arranged to prevent passage of a lubricating oil from the transfer chamber to the connecting passage, and
   the atmospheric chamber is opened to the atmosphere through a clearance in the joint surface.

14. A power transmission mechanism comprising:
   a first casing structure defining an atmospheric chamber which is formed between a transfer and a transmission connected with the transfer, and which is opened to an outside;
   a second casing structure defining a transfer chamber receiving a transfer mechanism of the transfer, and defining a connecting passage through which the transfer chamber is connected to the atmospheric chamber; and
   a gas-liquid separating device interposed between the transfer chamber and the connecting passage so that the transfer chamber and the connecting passage are connected through the gas-liquid separating device, wherein
   the first casing structure comprises a transmission case and the second casing structure comprises a transfer case joined with the transmission case in a joint surface,
   the atmospheric chamber is formed between the transmission case and the transfer case,
   the gas-liquid separating device is arranged to prevent passage of a lubricating oil from the transfer chamber to the connecting passage, and
   the gas-liquid separating device comprises a partition member fixed to an inside surface of the transfer case, and arranged to define a gas-liquid separating chamber between the partition member and the transfer case.

15. A power transmission mechanism comprising:
   a first casing structure defining an atmospheric chamber which is formed between a transfer and a transmission connected with the transfer, and which is opened to an outside;
   a second casing structure defining a transfer chamber receiving a transfer mechanism of the transfer, and defining a connecting passage through which the transfer chamber is connected to the atmospheric chamber; and
   a gas-liquid separating device interposed between the transfer chamber and the connecting passage so that the transfer chamber and the connecting passage are connected through the gas-liquid separating device, wherein
   the first casing structure comprises a transmission case and the second casing structure comprises a transfer case joined with the transmission case in a joint surface,
   the atmospheric chamber is formed between the transmission case and the transfer case, the gas-liquid separating device is arranged to prevent passage of a lubricating oil from the transfer chamber to the connecting passage, the transmission case comprises a first wall, the transfer case comprises a second wall, and the atmospheric chamber is bounded between the first wall on one side of the joint surface and the second wall on the other side of the joint surface, and the first wall separates the atmospheric chamber from a transmission chamber receiving a transmission mechanism of the transmission.

16. A power transmission mechanism comprising:

a first casing structure including a transmission case defining an atmospheric chamber which is formed between a transfer and a transmission connected with the transfer; and a second casing structure defining a transfer chamber receiving a transfer mechanism of the transfer, and defining a connecting passage through which the transfer chamber is connected to the atmospheric chamber, the second casing structure including a transfer case joined to the transmission case in a joint surface, the atmospheric chamber being opened to an outside through a clearance in the joint surface between the transmission case and the transfer case.

17. The power transmission mechanism as claimed in claim 16, wherein one of the first and second casing structures includes a lower portion defining an atmospheric hole formed in a lower portion of the atmospheric chamber and opened to the atmosphere.

18. A power transmission mechanism comprising:

a first casing structure including a transmission case defining an atmospheric chamber which is formed between a transfer and a transmission connected with the transfer; and a second casing structure defining a transfer chamber receiving a transfer mechanism of the transfer, and defining a connecting passage through which the transfer chamber is connected to the atmospheric chamber, the second casing structure including a transfer case joined to the transmission case, one of the transmission case and the transfer case including a rib wall formed with a reinforcing rib and arranged to define the atmospheric chamber and to separate the atmospheric chamber from a transmission chamber containing a transmission mechanism, the rib wall surrounding a shaft drivingly connecting the transmission mechanism of the transmission with the transfer mechanism of the transfer.

19. The power transmission mechanism as claimed in claim 18, wherein the rib wall is formed in the transmission case and arranged to separate the atmospheric chamber from the transmission chamber.

20. A power transmission mechanism comprising a first casing structure defining an atmospheric chamber which is formed between a transfer and a transmission connected with the transfer, and which is opened to an outside:

a second casing structure defining a transfer chamber receiving a transfer mechanism of the transfer, and defining a connecting passage through which the transfer chamber is connected to the atmospheric chamber; and a gas-liquid separating device interposed between the transfer chamber and the connecting passage so that the transfer chamber and the connecting passage are connected through the gas-liquid separating device;

wherein the first casing structure includes a separating wall separating the atmospheric chamber from a transmission chamber containing a transmission mechanism; and wherein the power transmission mechanism further comprises the transmission and the transfer includes the transfer mechanism that apportions a driving torque of an engine between front and rear axles of a four wheel drive vehicle.

* * * * *